United States Patent
Wu et al.

(10) Patent No.: US 9,684,957 B2
(45) Date of Patent: Jun. 20, 2017

(54) SYSTEMS METHODS, AND MEDIA FOR DETECTING AN ANATOMICAL OBJECT IN A MEDICAL DEVICE IMAGE USING A MULTI-STAGE CLASSIFIER

(75) Inventors: Hong Wu, Tempe, AZ (US); Kun Deng, Phoenix, AZ (US); Jianming Liang, Phoenix, AZ (US)

(73) Assignee: Arizona Board of Regents, a body corporate of the State of Arizona, acting for and on behalf of Arizona State University, Scottsdale, AZ (US)

( * ) Notice: Subject to any disclaimer, the term of this patent is extended or adjusted under 35 U.S.C. 154(b) by 282 days.

(21) Appl. No.: 13/984,808

(22) PCT Filed: Feb. 13, 2012

(86) PCT No.: PCT/US2012/024907
§ 371 (c)(1),
(2), (4) Date: Feb. 24, 2014

(87) PCT Pub. No.: WO2012/109670
PCT Pub. Date: Aug. 16, 2012

(65) Prior Publication Data
US 2014/0185887 A1    Jul. 3, 2014

Related U.S. Application Data

(60) Provisional application No. 61/442,112, filed on Feb. 11, 2011.

(51) Int. Cl.
*G06K 9/00* (2006.01)
*G06T 7/00* (2017.01)
*G06K 9/62* (2006.01)

(52) U.S. Cl.
CPC .......... *G06T 7/0012* (2013.01); *G06K 9/6231* (2013.01); *G06K 9/6257* (2013.01)

(58) Field of Classification Search
None
See application file for complete search history.

(56) References Cited

U.S. PATENT DOCUMENTS 7,526,101 B2    4/2009   Avidan
7,840,061 B2    11/2010  Porikli et al.
(Continued)

OTHER PUBLICATIONS

"Deep Vein Thrombosis Overview", Technical Report, Society of Interventional Radiology, last accessed Sep. 17, 2014, pp. 1-3, available at: http://www.sirweb.org/patients/deep-vein-thrombosis/.
(Continued)

*Primary Examiner* — Tahmina Ansari
(74) *Attorney, Agent, or Firm* — Byrne Poh LLP

(57) ABSTRACT

Systems, methods, and media for detecting an anatomical object in a medical device image are provided. In some embodiments, system for detecting an anatomical object in a medical device image are provided, the systems comprising: at least one hardware processor that: applies the medical device image to a classifier having a plurality of stages, wherein a first stage of the plurality of stages and a second stage of the plurality of stages each includes a strong learner formed from a plurality of weak learners, and the weak learners in the second stage include a plurality of the weak learners included in the first stage; and identifies the medical device image as being positive or negative of showing the anatomical object based on the application the medical device image to be classifier.

24 Claims, 8 Drawing Sheets

(56) References Cited

U.S. PATENT DOCUMENTS

| | | | | |
|---|---|---|---|---|
| 8,812,431 | B2* | 8/2014 | Voigt | G06N 5/00 600/416 |
| 2003/0199762 | A1 | 10/2003 | Fritz et al. | |
| 2004/0208341 | A1 | 10/2004 | Zhou et al. | |
| 2005/0220336 | A1 | 10/2005 | Sabe et al. | |
| 2005/0228276 | A1 | 10/2005 | He et al. | |
| 2006/0074834 | A1* | 4/2006 | Dong | G06K 9/6256 706/45 |
| 2006/0204121 | A1 | 9/2006 | Bryll | |
| 2007/0280530 | A1 | 12/2007 | Fung et al. | |
| 2008/0009733 | A1 | 1/2008 | Saksena | |
| 2008/0027887 | A1 | 1/2008 | Barbu et al. | |
| 2008/0089571 | A1 | 4/2008 | Kurita | |
| 2008/0154565 | A1* | 6/2008 | Florin | G06K 9/6256 703/11 |
| 2008/0171939 | A1 | 7/2008 | Ishihara | |
| 2008/0192887 | A1 | 8/2008 | Weese et al. | |
| 2008/0194957 | A1 | 8/2008 | Hoctor et al. | |
| 2008/0205750 | A1 | 8/2008 | Porikli et al. | |
| 2008/0240532 | A1 | 10/2008 | Carneiro et al. | |
| 2008/0260230 | A1 | 10/2008 | Gotardo et al. | |
| 2009/0034816 | A1 | 2/2009 | Ghanem et al. | |
| 2009/0060307 | A1 | 3/2009 | Ghanem et al. | |
| 2009/0175515 | A1 | 7/2009 | Schummers | |
| 2009/0252394 | A1 | 10/2009 | Liang et al. | |
| 2010/0046815 | A1 | 2/2010 | Von Berg et al. | |
| 2010/0061601 | A1 | 3/2010 | Abramoff et al. | |
| 2010/0076517 | A1 | 3/2010 | Imran | |
| 2010/0098308 | A1 | 4/2010 | Lakare et al. | |
| 2010/0113930 | A1 | 5/2010 | Miyachi | |
| 2010/0177944 | A1 | 7/2010 | Madabhushi et al. | |
| 2010/0202681 | A1 | 8/2010 | Ai et al. | |
| 2010/0266176 | A1 | 10/2010 | Masumoto et al. | |
| 2011/0191283 | A1* | 8/2011 | Voigt | G06G 7/60 706/54 |
| 2011/0270089 | A1 | 11/2011 | Vezina | |
| 2011/0293157 | A1 | 12/2011 | Ye et al. | |
| 2012/0089545 | A1 | 4/2012 | Mei et al. | |
| 2012/0106815 | A1 | 5/2012 | Yang et al. | |
| 2012/0274755 | A1 | 11/2012 | Sinha et al. | |
| 2013/0070997 | A1 | 3/2013 | Tajbakhsh et al. | |
| 2014/0185887 | A1* | 7/2014 | Wu | G06K 9/6231 382/128 |

OTHER PUBLICATIONS

Bi, J. and Liang, J., "Multiple instance learning of pulmonary embolism detection with geodesic distance along vascular structure", In Proceedings of IEEE Computer Society Conference on Computer Vision and Pattern Recognition (CVPR) Jun. 17-22, 2007, Minneapolis, MN, USA, pp. 1-8.
Bouma, H., "Vessel-Diameter Quantification and Embolus Detection in CTA Images." Ph.D. Thesis, Eindhoven University of Technology, PrintPartners, Ipskamp, The Netherlands, Apr. 2008, pp. 9-133.
Bouma, H., et al, "Automatic Detection of Pulmonary Embolism in CTA Images", In IEEE Transactions on Medical Imaging, vol. 28, No. 8, Aug. 2009, pp. 1223-1230.
Bourdev, L. and Brandt, J., et al., "Robust Object Detection Via Soft Cascade", In Proceedings of the 2005 IEEE Conference on Computer Vision and Pattern Recognition (CVPR '05), Washington, DC, USA, Jun. 2005, pp. 236-243.
Chartrand-Lefebvre, C., "Computed tomography angiography in the diagnosis of pulmonary embolism: Interobserver agreement", In American Journal of Emergency Medicine, Jan. 27, 2011, pp. 118-119.
Cho, E.J., et al., "Right ventricular free wall circumferential strain reflects graded elevation in acute right ventricular afterload", In Am J Physiol Heart Circ Physiol., Feb. 2009, vol. 296, No. 2, pp. 818-824.
Costantino, G., et al., "Interobserver agreement in computer tomography readings for pulmonary embolism", In American Journal of Emergency Medicine, Jan. 27, 2011, pp. 119.
Costantino, G., et al., "Interobserver agreement in computer tomography readings for pulmonary embolism", In American Journal of Emergency Medicine, vol. 27, No. 9, Nov. 2009, pp. 1109-1111.
Craig, J.J., "Introduction to Robotics: Mechanics and Control", 3rd edition, Prentice Hall, Aug. 6, 2004, pp. 1-385.
Criminisi, A., et al., "Regression Forests for Efficient Anatomy Detection and Localization in CT Studies", In Proceedings of the International Workshop on Medical Computer Vision, Beijing, CN, Sep. 2010, pp. 106-117.
Crow, F.C., "Summed-Area Tables for Texture Mapping", In Computer Graphics, vol. 18, No. 3, Jul. 1984, pp. 207-212.
Dinesh, M.S., et al, "Adaptive Contrast-Based Computer Aided Detection for Pulmonary Embolism", In Proceedings of the SPIE International Society Conference for Optimal Engineering, Mar. 2009, vol. 7260, No. 726010, pp. 1-8.
Dollar, P., et al., "Multiple Component Learning for Object Detection", In Proceedings of the 10th European Conference on Computer Vision: Part II (ECCV '08), Marseille, FR, Oct. 12-18, 2008, pp. 211-224.
Dousset, M., et al., "Principles and performance of virtual CT and MIRA intraluminal endoscopy", In Virtual Endoscopy, Springer, Nov. 2002, pp. 1-19.
Frangi, A.F., et al., "Multiscale vessel enhancement filtering", In Medical Image Computing and Computer-Assisted Intervention, Oct. 11-13, 1998, pp. 130-137.
Freund, Y. and Schapire, R.E., "A Decision-Theoretic Generalization of On-Line Learning and an Application to Boosting", In Journal of Computer and System Sciences, vol. 55, No. 1, Aug. 1997, pp. 119-139.
Freund, Y. and Schapire, R.E., "A Short Introduction to Boosting", In Journal of Japanese Society for Artificial Intelligence, vol. 14, No. 5, Sep. 1999, pp. 771-780.
Galson, S.K., "The surgeon general's call to action to prevent deep vein thrombosis and pulmonary embolism", Technical Report, U.S. Public Health Services, Sep. 15, 2008, pp. 1-35.
Godec, M., et al., "On-line Random Naive Bayes for Tracking", In Proceedings of the 20th International Conference (ICPR '10), Istanbul, TR, Aug. 23-26, 2010, pp. 3545-3548.
Goldstein, H., "Classical Mechanics", 2nd Edition, Jul. 1980, pp. 1-2.
Grabner, H. and Bischof, H., "On-line Boosting and Vision", In Proceedings of the IEEE Computer Society Conference on Computer Vision and Pattern Recognition (CVPR '06), New York, NY, USA, Jun. 17-22, 2006, pp. 260-267.
Grbovic, M. and Vucetic, S., "Tracking Concept Change with Incremental Boosting by Minimization of the Evolving Exponential Loss", In Proceedings of the European Conference on Machine Learning and Knowledge Discovery in Databases, Athens, GR, Sep. 5-9, 2011, pp. 516-532.
Groth, M., et al., "Correlation of right ventricular dysfunction parameters and pulmonary vascular obstruction score in acute pulmonary embolism in a porcine model", In Emergency Radiology, Sep. 2010, pp. 367-374.
He, H., et al., "Incremental Learning from Stream Data," In IEEE Transactions on Neural Networks, vol. 22, No. 12, Dec. 2011, pp. 1901-1914.
International Patent Application No. PCT/US2013/024675, filed Feb. 4, 2013.
International Patent Application No. PCT/US2013/024677, filed Feb. 4, 2013.
International Preliminary Report on Patentability dated Aug. 22, 2013 in International Patent Application No. PCT/US2012/024925.
International Preliminary Report on Patentability in International Application No. PCT/US2012/024907, filed Feb. 13, 2012, mailed Aug. 22, 2013.
International Search Report in International Patent Application No. PCT/US2012/024925, filed Feb. 13, 2012, mailed Jun. 19, 2012.
International Search Report in International Patent Application No. PCT/US2013/024675, filed Feb. 4, 2013, mailed Apr. 16, 2013.
International Search Report in International Patent Application No. PCT/US2013/024677, filed Feb. 4, 2013, mailed Apr. 15, 2013.
Kanitsar, A., et al., "CPR—Curved Planar Reformation", In Proceedings of IEEE Visualization, Nov. 1, 2002, pp. 37-44.

(56) References Cited

OTHER PUBLICATIONS

Kim, T.K., et al., "Online Multiple Classier Boosting for Object Tracking", In Proceedings of the 2010 IEEE Computer Society Conference on Computer vision and Pattern Recognition Workshops (CVPRW '10), San Francisco, CA, USA, Jun. 13-18, 2010, pp. 1-6.
Kiraly, A.P., et al., "Cartwheel projections of segmented pulmonary vasculature for the detection of pulmonary embolism", In Medical Imaging: Visualization, Image-Guided Procedures, and Display, Proc. SPIE 5744, Apr. 12, 2005, pp. 69-78.
Knutsson, H., "Representing Local Structure using Tensors", In Proceedings of the 6th Scandinavian Conference on Image Analysis, Oulu, Finland, Jun. 1989, pp. 244-251.
Kothe, U., "Edge and Junction Detection with an Improved Structure Tensor", In Proceedings of the 25th DAGM Symposium on Pattern Recognition, Magdeburg, DE, Sep. 10-12, 2003, pp. 25-32.
Kurkure, U., et al., "Automated Segmentation of Thoracic Aorta in Non-Contrast CT Images", In Proceedings of the 5th International Symposium on Biomedical Imaging: From Nano to Macro (ISBI '08), Paris, FR, May 14-17, 2008, pp. 29-32.
Leistner, C., et al., "On Robustness of On-Line Boosting—A Competitive Study", In Proceedings of the 2009 IEEE 12th International Conference on Computer Vision Workshops (ICCVW '09), Kyoto, JP, Sep. 27,-Oct. 4, 2009, pp. 1362-1369.
Liang, J. and Bi, J., "Computer Aided Detection of Pulmonary Embolism with Tobogganing and Multiple Instance Classification in CT Pulmonary Angiography", In Proceedings of the 20th Intl Conference of Information Processing in Medical Imaging Kerkrade, NL, Jul. 2-6, 2007, pp. 630-641.
Liang, J. and Bi, J., "Local Characteristic Features for Computer-Aided Detection of Pulmonary Embolism in CT Angiography", In Proceedings of the First Workshop on Pulmonary Image Analysis, New York, NY, US, Sep. 6, 2008, pp. 263-272.
Liu, D., et al., "Search strategies for multiple landmark detection by submodular maximization", IEEE Conference on Computer Vision and Pattern Recognition, Jun. 3-8, 2010, San Francisco, CA, USA, pp. 2831-2838.
Liu, X. and Yu, T., "Gradient Feature Selection for Online Boosting", In Proceedings of the IEEE 11th International Conference on Computer Vision (ICCV '07), Rio de Janeiro, BR, Oct. 14-21, 2007, pp. 1-8.
Lorenz, C., et al., "Multi-scale line segmentation with automatic estimation of width, contrast and tangential direction in 2-D and 3-D medical images", In Proc. of the Joint Conference on Computer Vision, Virtual Reality and Robotics in Medicine, London, UK, Mar. 19-22, 1997, pp. 233-242.
Masutani, Y., et al., "Computerized Detection of Pulmonary Embolism in Spiral CT Angiography Based on Volumetric Image Analysis", In IEEE Transactions on Medical Imaging, vol. 21, No. 12, Dec. 2002, pp. 1517-1523.
Office Action dated Jul. 17, 2014 in U.S. Appl. No. 13/621,837.
Office Action dated Aug. 23, 2013 in U.S. Appl. No. 13/984,808.
Office Action dated Oct. 7, 2013 in U.S. Appl. No. 14/023,380.
Office Action dated Sep. 18, 2013 in European Patent Application No. 12744949.4.
Ouellette, D.R., et al., "Pulmonary Embolism", Medscape.com, last updated Sep. 4, 2014, available at: http://emedicine.medscape.com/article/300901-overview#showall, pp. 1-24.
Oza, N. C. and Russell, S., "Online Bagging and Boosting", In Artificial Intelligence and Statistics, 2001, pp. 105-112.
Parag, T., et al., "Boosting Adaptive Linear Weak Classifiers for Online Learning and Tracking", In Proceedings of the IEEE Conference on Computer Vision and Recognition (CVPR '08), Anchorage, AK, USA, Jun. 23-28, 2008, pp. 1-8.
Parikh, D. and Polikar, R., "An Ensemble-Based Incremental Learning Approach to Data Fusion", In IEEE Transactions on Systems, Man, Cybernetics, Part B: Cybernetics, vol. 37, No. 2, Apr. 2007, pp. 437-450.
Pelossof, R., et al., "Online Coordinate Boosting", In Proceedings of the 2009 IEEE 12th International Conference on Computer Vision Workshops, (ICCVW '09), Kyoto, JP, Sep. 27,-Oct. 4, 2009, pp. 1354-1361.
Pham, M. and Cham, T., "Detection with Multi-exit Asymmetric Boosting", In Proceedings of the IEEE Conference on Computer Vision and Pattern Recognition (CVPR '08), Anchorage, AK, USA, Jun. 23-28, 2008, pp. 1-8.
Pham, M. and Cham, T., "Fast Training and Selection of Haar Features Using Statistics in Boosting-Based Face Detection", In Proceedings of the IEEE 11th International Conference on Computer Vision (ICCV '07), Rio de Janeiro, BR, Oct. 14-21, 2007, pp. 1-7.
Pham, M. and Cham, T., "Online Learning Asymmetric Boosted Classifiers for Object Detection", In Proceedings of the IEEE Conference on Computer Vision and Recogition (CVPR '07), Minneapolis, MN, USA, Jun. 17-22, 2007, pp. 1-8.
Sato, Y. et al., "3-D multi-scale line filter for segmentation and visualization of curvilinear structures in medical images", In Proc. of the Joint Conference on Computer Vision, Virtual Reality and Robotics in Medicine, London, UK, Mar. 19-22, 1997, pp. 213-222.
Schapire, R. E. and Singer, Y., "BoosTexter: A Boosting-Based System for Text Categorization", In Machine Learning, vol. 39, No. 2, May 1, 2000, pp. 135-168.
Schapire, R. E., "Theoretical Views of Boosting and Applications", In Algorithmic Learning Theory, Lecture Notes in Computer Science, vol. 1720, Dec. 1999, pp. 13-25.
Sebbe, R., "Computer-aided Diagnosis of Pulmonary Embolism in Opacified CT Images", Ph.D. Dissertation, Faculte Polytechnique de Mons, Universitaires de Louvain, Belgium, Feb. 20, 2007, pp. 1-124.
Simon, M., et al., "Paddle-wheel CT display of pulmonary arteries and other lung structures: a new imaging approach", In American Journal of Roentgenology, Jul. 2001, pp. 195-198.
Simon, M., et al., "Paddle-wheel multislice helical CT display of pulmonary vessels and other lung structures", In Radiologic Clinics of North America, May 2003, pp. 617-626.
Stein, P.D. and Hull, R.D., "Multidetector computed tomography for the diagnosis of acute pulmonary embolism", In Current Opinion Pulmonary Medicine, Sep. 2007, pp. 384-388.
Stein, P.D. and Matta, F., "Acute Pulmonary Embolism", In Current Problems in Cardiology, vol. 35, No. 7, Jul. 2010, pp. 314-376.
Sternig, S., et al., "Transient Boost: On-line Boosting with Transient data", In Proceedings of the 2010 IEEE Computer Society Conference on Computer Vision and Pattern Recognition Workshops (CVPRW '10), San Francisco, CA, USA, Jun. 13-18, 2010, pp. 22-27.
Torbicki, A., et al., "Guidelines on the diagnosis and management of acute pulmonary embolism of the European Society of Cardiology", In Eur Heart J., vol. 29, No. 18, Sep. 2008, pp. 2276-2315.
Vaidehi, V., et al., "Multiclass Object Detection System in Imaging Sensor Network Using Haar-like Features and Joint-Boosting Algorithm", In Proceedings of the 2011 International Conference on Recent Trends in Information Technology (ICRTIT '11), Chennai, Tamil Nadu, IN, Jun. 3-5, 2011, pp. 1011-1015.
Viola, P. and Jones M., "Fast and Robust Classification Using Asymmetric AdaBoost and a Detector Cascade", In Proceedings of the Annual Conference on Neural Information Processing Systems, Vancouver, BC, CA, Dec. 3-8, 2001, pp. 1311-1318.
Viola, P. and Jones, M., "Rapid Object Detection using a Boosted Cascade of Simple Features", In Proceedings of the IEEE Computer Society Conference on Computer Vision and Pattern Recognition, Kauai, HI, USA. Dec. 8-14, 2001, pp. 511-518.
Written Opinion in International Patent Application No. PCT/US2012/024925, filed Feb. 13, 2012, mailed Jun. 19, 2012.
Written Opinion in International Patent Application No. PCT/US2013/024675, filed Feb. 4, 2013, mailed Apr. 16, 2013.
Written Opinion in International Patent Application No. PCT/US2013/024677, filed Feb. 4, 2013, mailed Apr. 15, 2013.
Wu, B. and Nevatia, R., "Improving Part Based Object Detection by Unsupervised, Online Boosting", In Proceedings of the IEEE Conference on Computer Vision and Pattern Recognition (CVPR '07), Minneapolis, MN, USA, Jun. 17-22, 2007, pp. 1-8.

(56) References Cited

OTHER PUBLICATIONS

Wu, H., et al., "Machine Learning based Automatic Detection of Pulmonary Trunk", In Proceedings of the SPIE Conference on Medical Imaging 2011: Computer-Aided Diagnosis, Lake Buena Vista, FL, USA, Feb. 12, 2011, vol. 7963, pp. 1-6.

Zheng, Y., et al., "Automatic Aorta Segmentation and Valve Landmark Detection in C-Arm CT: Application to Aortic Valve Implantation", In IEEE Transactions on Medical Imaging, vol. 31, No. 12, Dec. 2012, pp. 2307-2321.

Zheng, Y., et al., "Fast Automatic Heart Chamber Segmentation from 3D CT Data Using Marginal Space Learning and Steerable Features", In Proceedings of the IEEE 11th International Conference on Computer Vision (ICCV '07), Rio de Janeiro, BR, Oct. 14-21, 2007, pp. 1-8.

Zhou, C., et al., "Automatic Pulmonary Vessel Segmentation in 3D Computed Tomographic Pulmonary Angiographic (CTPA) Images", In Proceedings of the SPIE 6144, Medical Imaging: Image Processing, Mar. 15, 2006, pp. Q1-Q7.

Zhou, S. K., et al., "A Boosting Regression Approach to Medical Anatomy Detection", In Proceedings of the IEEE Conference on Computer Vision and Pattern Recognition (CVPR '07), Minneapolis, MN, USA, Jun. 17-22, 2007, pp. 1-8.

Zou, X., et al., "Anatomy-Based Automatic Detection and Segmentation of Major Vessels in Thoracic CTA Images", In Computerized Medical Imaging and Graphics, vol. 30, No. 5, Jul. 2006, pp. 299-313.

Alonso-Martinez, J.L., et al., "Delay and Misdiagnosis in Sub-Massive and Non-Massive Acute Pulmonary Embolism", In European Journal of Internal Medicine, vol. 21, No. 4, Aug. 2010, pp. 278-282.

Araoz, P.A., et al., "Helical CT Pulmonary Angiography Predictors of In-Hospital Morbidity and Mortality in Patients with Acute Pulmonary Embolism", In Journal of Thoracic Imaging, vol. 18, Oct. 2003, pp. 207-216.

Bottiger, B.W., et al., "Inhaled Nitric Oxide Selectively Decreases Pulmonary Artery Pressure and Pulmonary Vascular Resistance Following Acute Massive Pulmonary Microembolism in Piglets", In Chest, vol. 110, No. 4, Oct. 1996, pp. 1041-1047.

Collomb, J., et al., "Severity Assessment of Acute Pulmonary Embolism: Evaluation using Helical CT", In European Radiology, vol. 13, No. 7, Feb. 2003, pp. 1508-1514.

Dias-Junior, C.A., "The Effect of Sildenafil on Pulmonary Embolism-Induced Oxidative Stress and Pulmonary Hypertension", In Anesthesia & Analgesia, vol. 101, No. 1, Jul. 2005, pp. 115-120.

Ghaye, B., et al., "Can CT Pulmonary Angiography Allow Assessment of Severity and Prognosis in Patients Presenting with Pulmonary Embolism? What the Radiologist Needs to Know", In RadioGraphics, vol. 26, Jan. 2006, pp. 23-29.

Ghaye, B., et al., "Severe Pulmonary Embolism: Pulmonary Artery Clot Load Scores and Cardiovascular Parameters as Predictors of Mortality", In Radiology, vol. 239, Apr. 2006, pp. 884-891.

Grifoni, S., "Short-Term Clinical Outcome of Patients with Acute Pulmonary Embolism, Normal Blood Pressure, and Echocardiographic Right Ventricular Dysfunction", In Circulation, vol. 101, No. 24, Jun. 2000, pp. 2817-2822.

Howard, G., et al., "For the ARIC Investigators: Carotid Artery Intimal-Medial Thickness Distribution in General Populations as Evaluated by B-Mode Ultrasound", In Stroke, vol. 24, No. 9, Sep. 1993, pp. 1297-1304.

Hurst, R., et al., "Clinical Use of Carotid Intima-Media Thickness: Review of the Literature", In Journal of the American Society of Echocardiography, vol. 20, No. 7, Jul. 2007, pp. 907-914.

Jardin, F., et al., "Echocardiographic Pattern of Acute Cor Pulmonale", In Chest, vol. 111, No. 1, Jan. 1997, pp. 209-217.

Kass, M., et al., "Snakes: Active Contour Models", In International Journal of Computer Vision, vol. 1, No. 4, Jan. 1988, pp. 321-331.

Levenberg, K., "A Method for the Solution of Certain Non-Linear Problems in Least Squares", In Quarterly Journal of Applied Mathmatics, vol. 2, Jul. 1944, pp. 164-168.

Li, S., et al., "Childhood Cardiovascular Risk Factors and Carotid Vascular Changes in Adulthood: the Bogalusa Heart Study", In the Journal of the American Medical Association (JAMA), vol. 290, No. 17, Nov. 2003, pp. 2271-2276.

Liang, J., et al., "United Snakes", In Medical Image Analysis, vol. 10 No. 2, Apr. 2006, vol. 215-233.

Mansencal, N., "Comparison of Different Echocardiographic Indexes Secondary to Right Ventricular Obstruction in Acute Pulmonary Embolism", In the American Journal of Cardiology, vol. 92, No. 1, Jul. 2003, pp. 116-119.

Marquardt, D.W., "An Algorithm for Least-Squares Estimation of Nonlinear Parameters", In SIAM Journal on Applied Mathematics, vol. 11 No. 2, Jun. 1963, pp. 431-441.

Mastora, I., "Severity of Acute Pulmonary Embolism: Evaluation of a New Spiral CT Angiographic Score in Correlation with Echocardiographic Data", In European Radiology, vol. 13, Jan. 2003, pp. 29-35.

McConnell, M.V., et al., "Regional Right Ventricular Dysfunction Detected by Echocardiography in Acute Pulmonary Embolism", In The American Journal of Cardiology, vol. 78 No. 4, Aug. 1996, pp. 469-473.

Office Action dated Jan. 22, 2015 in U.S. Appl. No. 14/376,181.
Office Action dated Jan. 29, 2015 in U.S. Appl. No. 13/621,837.

Ribeiro, A., et al., "Echocardiography Doppler in Pulmonary Embolism: Right Ventricular Dysfunction as a Predictor of Mortality Rate", In American Heart Journal, vol. 134, No. 3, Mar. 1997, pp. 479-487.

Stein, J., et al., "A Semiautomated Ultrasound Border Detection Program that Facilitates Clinical Measurement of Ultrasound Carotid Intima-Media Thickness", In the Journal of the American Society of Echocardiology, vol. 18, No. 3, Mar. 2005, pp. 244-251.

Stein, J., et al., "Use of Carotid Ultrasound to Identify Subclinical Vascular Disease & Evaluate Cardiovascular Disease Risk: A Consensus Statement from the American Society of Echocardiography Carotid Intima-Media Thickness Task Force", In the Journal of Am. Soc. of Echocardiography, vol. 21, No. 2, Feb. 2008, pp. 93-111.

Stein, J., et al., "Vascular Age: Integrating Carotid Intima-Media Thickness Measurements with Global Coronary Risk Assessment", In Clinical Cardiology, vol. 27, No. 7, Jul. 2004, pp. 388-392.

Tajbakhsh, N., et al., "Motion Analysis of Right Ventricular Dysfunction under Mild and Moderate Pressure Overload Caused by Acute Pulmonary Embolism", In Ultrasound in Medicine and Biology, vol. 39, No. 11, Nov. 2013, pp. 2066-2074.

Tajbakhsh, N., et al., "Shape-Based Analysis of Right Ventricular Dysfunction associated with Acute Pulmonary Embolism", In SPIE Medical Imaging, vol. 8317, Mar. 2012, pp. 1-5.

Takamura, T., et al., "Reversible Left Ventricular Regional Non-Uniformity Quantified by Speckle-Tracking Displacement and Strain Imaging in Patients with Acute Pulmonary Embolism", In Journal of the American Society of Echocardiography, vol. 24, No. 7, Apr. 2011, pp. 792-802.

Wu, H., "Offline and Online Adaboost for Detecting Anatomical Structures", Thesis Paper, Arizona State University, Aug. 2011, pp. 1-66.

Wu, H., et al. "Self-Adaptive Asymmetric On-line Boosting for Detecting Anatomical Structures", In SPIE Medical Imaging, vol. 8315, Feb. 2012, pp. 1-7.

Frangi, A.F., et al., "Model-Based Quantitation of 3-D Magnetic Resonance Angiographic Images", In IEEE Transactions on Medical Imaging, vol. 18, No. 10, Oct. 1999, pp. 946-956.

Office Action dated Apr. 24, 2015 in U.S. Appl. No. 14/023,380.
Notice of Allowance dated Sep. 14, 2015 in U.S. Appl. No. 13/621,837.
Office Action dated Jan. 4, 2016 in U.S. Appl. No. 14/023,380.
Office Action dated Nov. 27, 2015 in U.S. Appl. No. 14/376,568.
Patent Examination Report dated Aug. 26, 2015 in Australian Patent Application No. 2012214149.
Office Action dated Jun. 15, 2016 in U.S. Appl. No. 14/376,568.

\* cited by examiner

SYSTEMS METHODS, AND MEDIA FOR DETECTING AN ANATOMICAL OBJECT IN A MEDICAL DEVICE IMAGE USING A MULTI-STAGE CLASSIFIER

CROSS REFERENCE TO RELATED APPLICATION

This application claims the benefit on U.S. Provisional Patent Application No. 61/442,112, filed Feb. 11, 2011, which is hereby incorporated by reference herein in its entirety.

TECHNICAL FIELD

The disclosed subject matter relates to systems, methods, and media for detecting an anatomical object in a medical device image.

BACKGROUND

Pulmonary embolism (PE) is a relatively common cardiovascular emergency with about 600,000 cases occurring annually and causing approximately 200,000 deaths in the United States per year. A pulmonary embolus usually starts from the lower extremity, travels in the bloodstream through the heart and into the lungs, gets lodged in the pulmonary arteries, and subsequently blocks blood flow into, and oxygen exchange in, the lungs, leading to sudden death. Based on its relative location in the pulmonary arteries, an embolus may be classified into four groups (central, lobar, segmental and sub-segmental).

Computed tomography pulmonary angiography (CTPA) has become the test of choice for PE diagnosis. The interpretation of CTPA image datasets is made complex and time consuming by the intricate branching structure of the pulmonary vessels, a myriad of artifacts that may obscure or mimic PEs, and suboptimal bolus of contrast and inhomogeneity with the pulmonary arterial blood pool.

Several approaches for computer-aided diagnosis of PE in CTPA have been proposed. However, these approaches are not adequately capable of detecting central PEs, distinguishing the pulmonary artery from the vein to effectively remove any false positives from the veins, and dynamically adapting to suboptimal contrast conditions associated the CTPA scans.

Accordingly, new mechanisms for detecting an anatomical object in a medical device image are needed.

SUMMARY

Systems, methods, and media for detecting an anatomical object in a medical device image are provided. In some embodiments, system for detecting an anatomical object in a medical device image are provided, the systems comprising: at least one hardware processor that: applies the medical device image to a classifier having a plurality of stages, wherein a first stage of the plurality of stages and a second stage of the plurality of stages each includes a strong learner formed from a plurality of weak learners, and the weak learners in the second stage include a plurality of the weak learners included in the first stage; and identifies the medical device image as being positive or negative of showing the anatomical object based on the application the medical device image to the classifier.

In some embodiments, methods for detecting art anatomical object in a medical device image are provided, the methods comprising: applying the medical device image to a classifier having a plurality of stages, wherein a first stage of the plurality of stages and a second stage of the plurality of stages each includes a strong learner formed from a plurality of weak learners, and the weak learners in the second stage include a plurality of the weak learners included in the first stage; and identifying the medical device image as being positive or negative of showing the anatomical object based on the application the medical device image to the classifier.

In some embodiments, non-transitory computer-readable media containing computer-executable instructions that, when executed by a processor, cause the processor to perform a method for detecting an anatomical object in a medical device image are provided, the method comprising: applying the medical device image to a classifier having a plurality of stages, wherein a first stage of the plurality of stages and a second stage of the plurality of stages each includes a strong learner formed from a plurality of weak learners, and the weak learners in the second stage include a plurality of the weak learners included in the first stage; and identifying the medical device image as being positive or negative of showing the anatomical object based on the application the medical device image to the classifier.

DETAILED DESCRIPTION

Systems, methods, and media for detecting an anatomical object in a medical device image are provided. More particularly, in some embodiments, systems, methods, and media for detecting an anatomical object, such as a pulmonary trunk, in a medical device image, such as a computed tomography pulmonary angiography (CTPA) image, are provided.

The pulmonary trunk is the main pulmonary artery that rises from the right ventricle of the heart, extends upward, and divides into the right and left pulmonary arteries carrying blood to the lungs. Because PEs are only found in the pulmonary artery, identifying the pulmonary trunk in medical device images, such as CTPA images, can be used in PE diagnosis.

Figure 1:
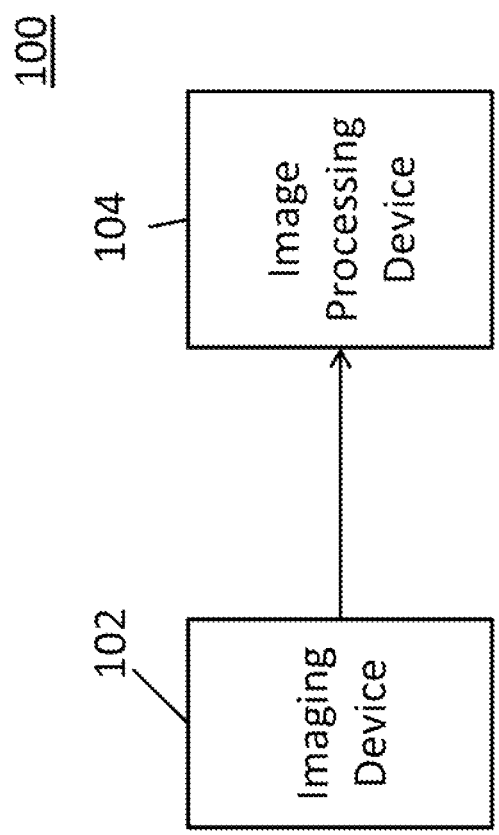
FIG. 1 is a block diagram of hardware that can be used in accordance with some embodiments.

Turning to FIG. 1, an example of hardware 100 that can be used in accordance with some embodiments is illustrated. As shown, this hardware can include an imaging device 102 and an image processing device 104. Imaging device 102 can be any suitable device for generating imaging data that can be provided to image processing device 104. For example, in some embodiments, imaging device 102 can be a computed tomography (CT) scanner. Image processing device 104 can be any suitable device for receiving and processing imaging data. For example, in some embodiments, image processing device 104 can be a computer. Imaging device 102 can communicate with image processing device 104 in any suitable manner such as via a direct connection between the devices, via a communication network, etc.

In some embodiments, image processing device 104 can be any of a general purpose device such as a computer or a special purpose device such as a client, a server, etc. Any of these general or special purpose devices can include any suitable components such as a hardware processor (which can be a microprocessor, digital signal processor, a controller, etc), memory, communication interfaces, display controllers, input devices, etc.

In some embodiments, imaging device 102 and image processing device 104 can be integrated into a single device.

In some embodiments, a machine-learning-based approach can be used by image processing device 104 for automatically detecting an anatomical object, such as a pulmonary trunk, in a medical device image.

Figure 2:
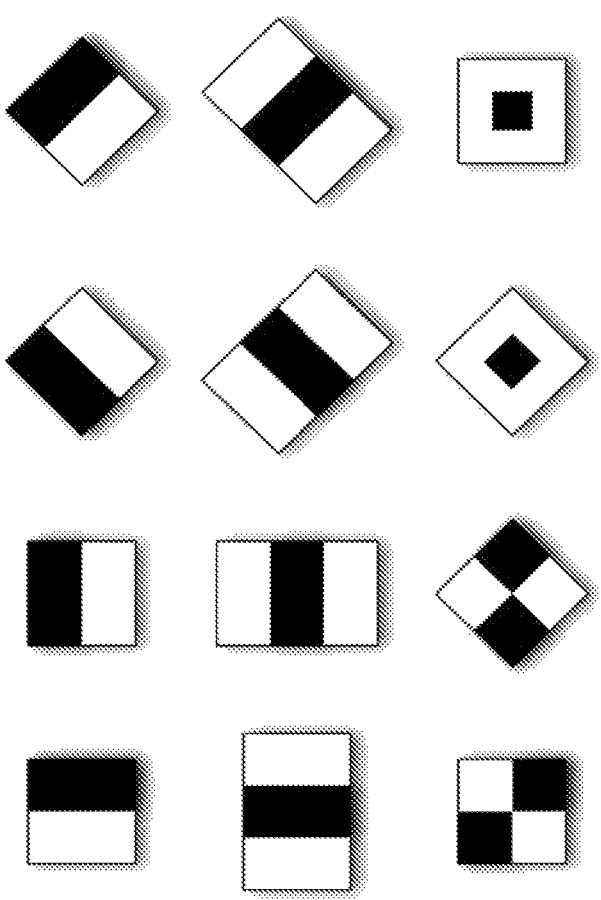
FIG. 2 shows examples of Haar features that can be used in accordance with some embodiments.

More particularly, for example, in some embodiments, a cascaded AdaBoost classifier can be trained with a large number of Haar features (example of which are shown in FIG. 2) extracted from computed tomography pulmonary angiography (CTPA) image samples, so that an anatomical object, such as a pulmonary trunk, can subsequently be automatically identified by sequentially scanning CTPA images and classifying each encountered sub-image with the trained classifier. In some embodiments, CTPA images can be automatically scanned at multiple scales to handle size variations of the anatomical objects (e.g., pulmonary trunks).

An AdaBoost classifier is a type of machine learning algorithm drat combines weak learners to create a single strong learner. A weak learner is a classifier that may perform only slightly better than random guessing. A commonly used weak classifier called the decision stump can be used to make a prediction based on the value of a single input feature.

For example, $h_1, h_2, \ldots, h_N$ make up a set of weak learners, a combination of these weak learners can be written as:

$$F(x) = \sum_{j=1}^{N} f_j(x) = \sum_{j=1}^{N} \omega_j h_j(x),$$

where $\omega_j$ is the corresponding coefficient for weak learner $h_j$. Boosting is a process to select weak learners $h_j$ and determine their coefficients $\omega_j$, so as to combine the selected weak learners to form a strong learner $F(x)$.

In some embodiments, AdaBoost can be used to select the most relevant, features from any suitable number (e.g., thousands) of Haar features, each corresponding to a weak learner. In some embodiments, a Haar feature can be defined in terms of two adjacent rectangle regions, which can be illustrated in white and black as shown in FIG. 2, for example. The value of a Haar feature can be the sum of any suitable pixels values (such as intensity) in one or more first rectangle(s) (e.g., the white rectangles) of the feature minus the sum of the suitable pixel values in one or more second rectangle(s) (e.g., the black rectangle(s)) of the feature.

In some embodiments, any suitable criteria, such as desired true positive rate, false positive rate, and number of weak learners, can be used to determine the number of strong boosted classifiers, the number of weak learners in each boosted classifier, and the relative operating characteristic (ROC) operating points (which can be selected from a ROC curve produced during training) for classifying images. For example, in some embodiments, a True Positive Rate (TPR) $\alpha_i$, a False Positive Rate (FPR) $\beta_i$, and a maximum number of weak learners $\eta_i$ can be used as criteria for training a cascaded classifier stage.

Figure 3:
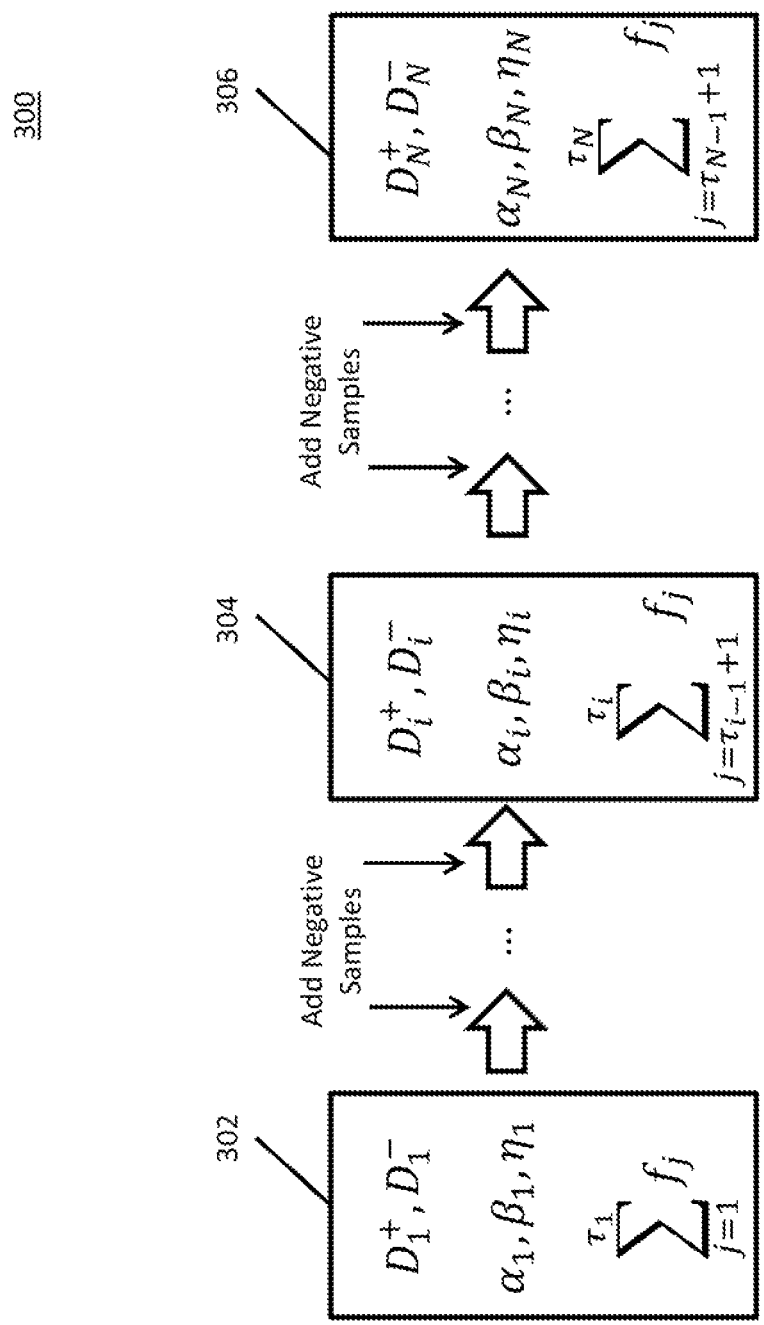
FIG. 3 is a block diagram of a multi-stage classifier in accordance with some embodiments.

As shown in FIG. 3, an AdaBoost classifier 300 can include any suitable number of strong classifier stages 302, 304, and 306. $D_i^+$, $D_i^-$ can be used to refer to positive sub-images and negative sub-images that can be used for training an AdaBoost classifier stage i. In each stage 302, 304, or 306, during training, weak learners can be added to tire stage until a given target performance ($\alpha_i$, $\beta_i$) or a given number of weak learners $\eta_i$ in the stage is reached. The output of the training at stage i is a boosted classifier containing weak learners from $f_{\tau_{i-1}+1}$ to $f_{96_i}$. Upon completing training a given stage, new negative samples can be classified by the stage to identify false positives (i.e., negative samples which are classified as positive) and then these negative samples (which are falsely classified as positives) can be combined with the negative samples used for training the current stage and the combination used for training the subsequent stage.

Figure 4:
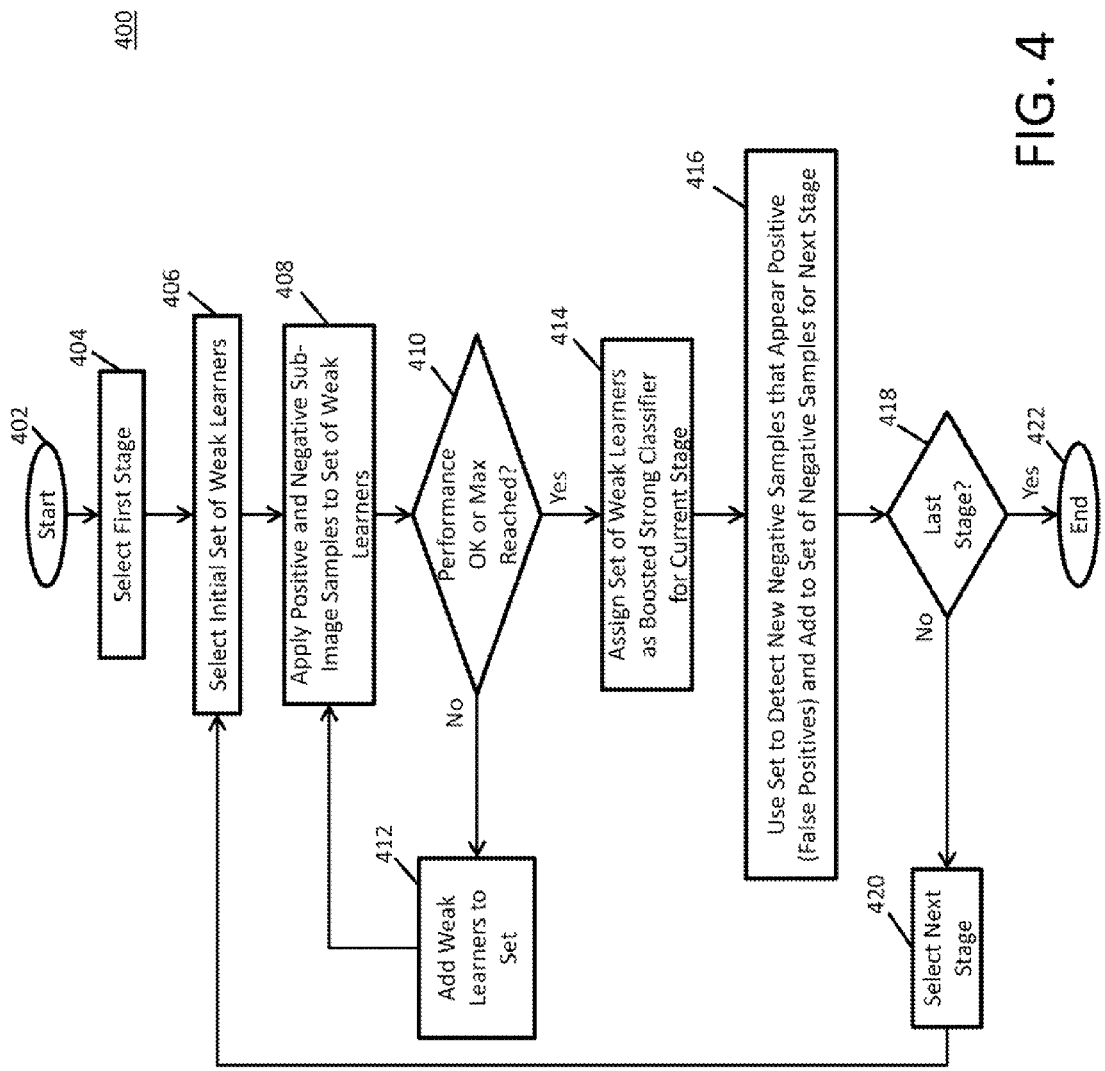
FIG. 4 is a flow diagram of a process for training a multi-stage classifier in accordance with some embodiments.

Turning to FIG. 4, an example process 400 for training this classifier in accordance with some embodiments is shown. As illustrated, after process 400 begins at 402, the process selects a first stage of the classifier to train. This stage can be selected in any suitable manner. Next, at 406, the process can select an initial set of weak learners for the stage. Any suitable number of weak learners, including one, can be selected, and the weak learners can be selected in any suitable manner, such as randomly. Then, at 408, process 400 can apply positive and negative sub-image samples to the set of weak learners. Any suitable number of positive and negative sub-image samples (e.g., 100 each) can be applied, and these samples can be selected for application in any suitable manner, such as randomly. The process can then determine at 410 whether the performance of the stage is sufficient or whether the maximum number of weak learners for the stage has been reached. Any suitable criteria or criterion can be used for determining whether the performance of the stage is sufficient in some embodiments. For example, in some embodiments, the performance of the stage can be deemed to be sufficient when the TPR $\alpha_i$ is over 0.99 and FPR $\beta_i$ is below 0.05. Any suitable threshold $\eta_i$ for a maximum number of weak learners can be used in some embodiments. For example, $\eta_i$ can be 30 in some embodiments. If it is determined at 410 that the performance is not sufficient and the maximum number of weak learners has not been reached, then process 400 can add one or more weak learners to the set at 412 and loop back to 408. The weak learners to be added can be selected in any suitable manner (e.g., randomly) and any suitable number of weak learners (including one) can be added, in some embodiments. Otherwise, at 414 process 400 can then assign the set of weak, learners to the boosted strong classifier for the current stage. Next, at 416, process 400 can use the set of weak, learners to detect new negative samples that appear positive (i.e., false positives) and add these new negative samples to the set of negative samples and use this new set for the next stage. Any suitable number of new negative samples, such as 100, can be used in some embodiments. At 418, process 400 can then determine whether the current stage is the last stage, and, if not, select the next stage at 420. Otherwise, process can end at 422.

Figure 5:
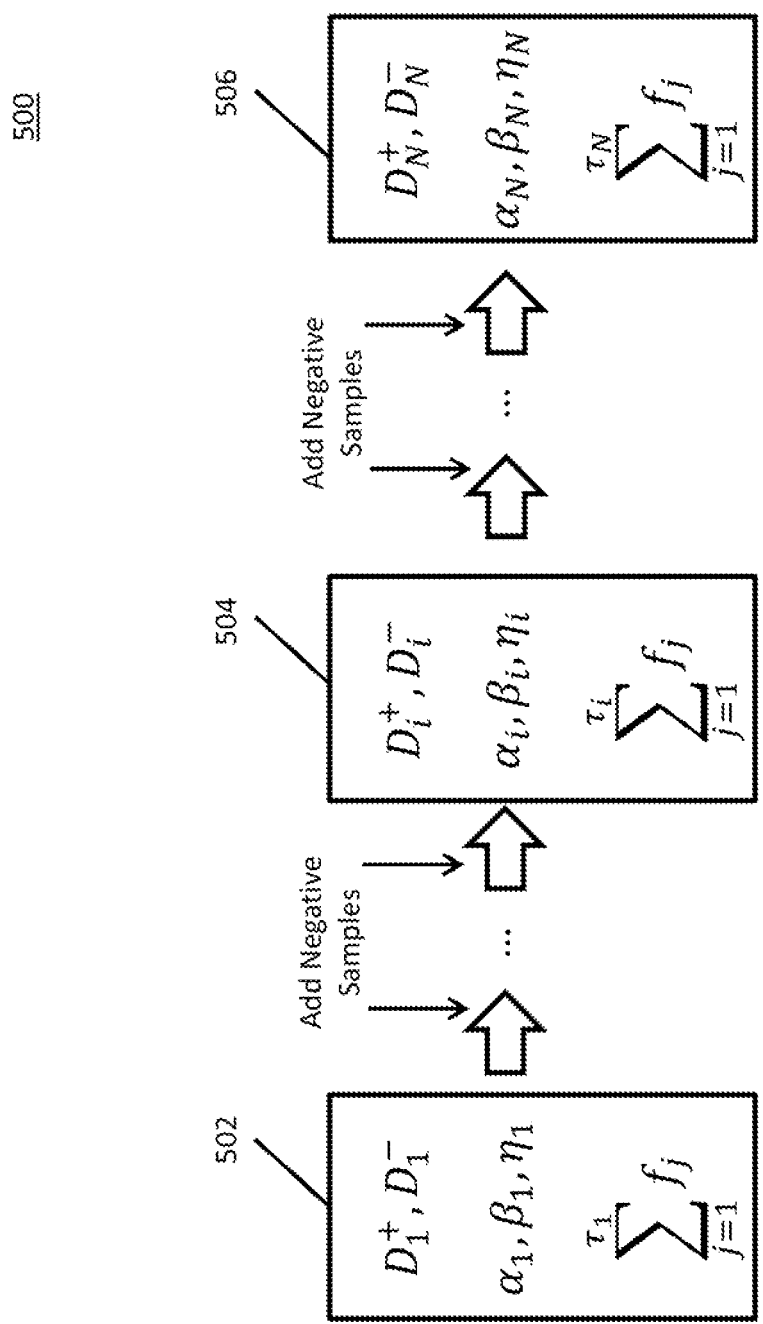
FIG. 5 is a block diagram of another multi-stage classifier in accordance with some embodiments.

Another example classifier 500 that can be used in some embodiments is illustrated in FIG. 5. As shown, classifier 500 can include any suitable number of strong classifier stages 502, 504, and 506. $D_i^+$, $D_i^-$ can be used to refer to positive sub-images and negative sub-images that can be used for the teaming a classifier stage i. In each stage 502, 504, or 506, during training, weak learners can be added to the stage until a given target performance ($\alpha_i$, $\beta_i$) or a given number of weak learners $\eta_i$ in the stage is reached. The output of the training at stage i is a boosted classifier 504 containing weak learners from $f_1$ to $f_{96_i}$. That is, a stage can include all of the weak learners of all previous stages in some embodiments. Upon completing training a given stage, new negative samples can be classified by the stage to identify false positives (i.e., negative samples which are classified as positive) and then these negative samples (which are falsely classified as positives) can be added to the negative samples from the current stage and used for training the subsequent stage.

Figure 6:
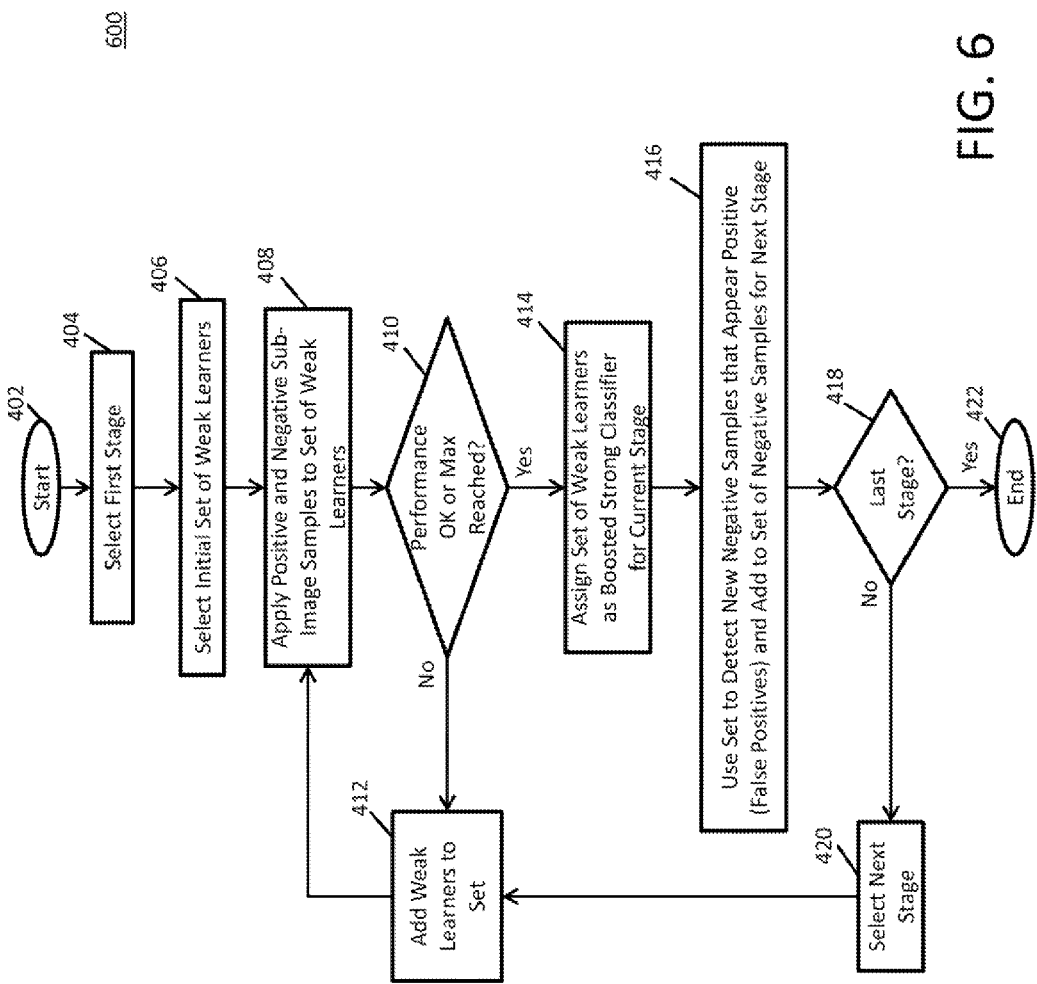
FIG. 6 is a flow diagram of another process for training a multi-stage classifier in accordance with some embodiments.

Turning to FIG. 6, an example process 600 for training this classifier in accordance with some embodiments is shown. As illustrated, process 600 includes steps 402, 404, 406, 408, 410, 412, 414, 416, 418, 420, and 422 which can be performed as described above in connection with process 400 of FIG. 4. Unlike in process 400, however, after performing step 420, process 600 can branch to step 412 rather than step 406.

In some embodiments, rather than using a multi-stage classifier as described above, a single stage classifier can be used. Such a classifier may include a single classifier stage 302 as shown in FIG. 3.

Figure 7:
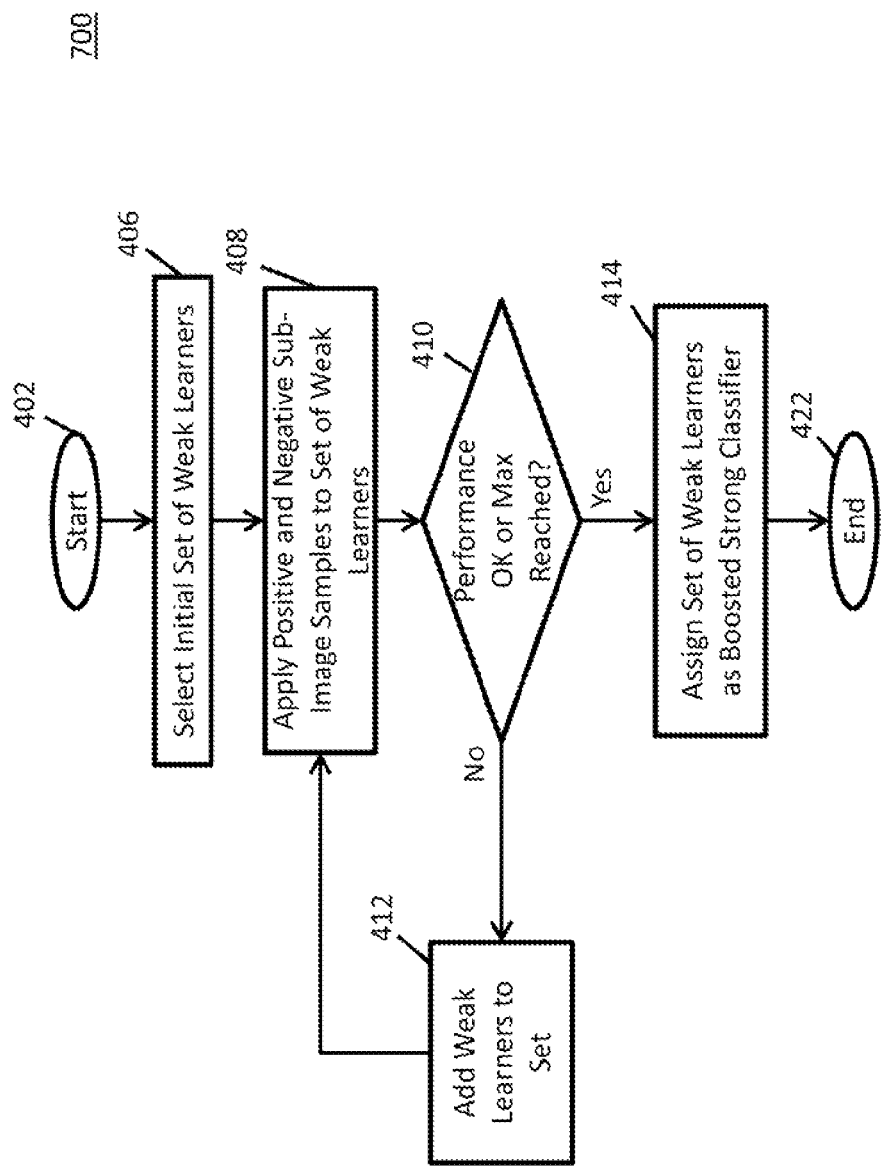
FIG. 7 is a flow diagram of a process for training a single-stage classifier in accordance with some embodiments.

Turning to FIG. 7, an example process 700 for training this classifier in accordance with some embodiments is shown. As illustrated, process 700 includes steps 402, 406, 408, 410, 412, 414, and 422 which can be performed as described above in connection with process 400 of FIG. 4. However, unlike process 400, in this approach, 100 positive samples (or any other suitable number) and 500 negative samples (or any other suitable number) can be used to train the single stage, and training can be completed when the TPR $\alpha_i$=100, the FPR $\beta_i$=0, and when the number of weak classifiers $\eta_i$=100. In some embodiments, negative samples can be false positive samples from other training techniques as described above.

As described above, to perform detection using a classifier, an image can be provided to the one or more stages of the classifier and a positive indication or a negative indication can be provided. If at any stage in the classifier, an image is classified as negative, the image can be removed from subsequent testing by subsequent stages of the classifier and the classification of the image can be maintained as negative.

Figure 8:
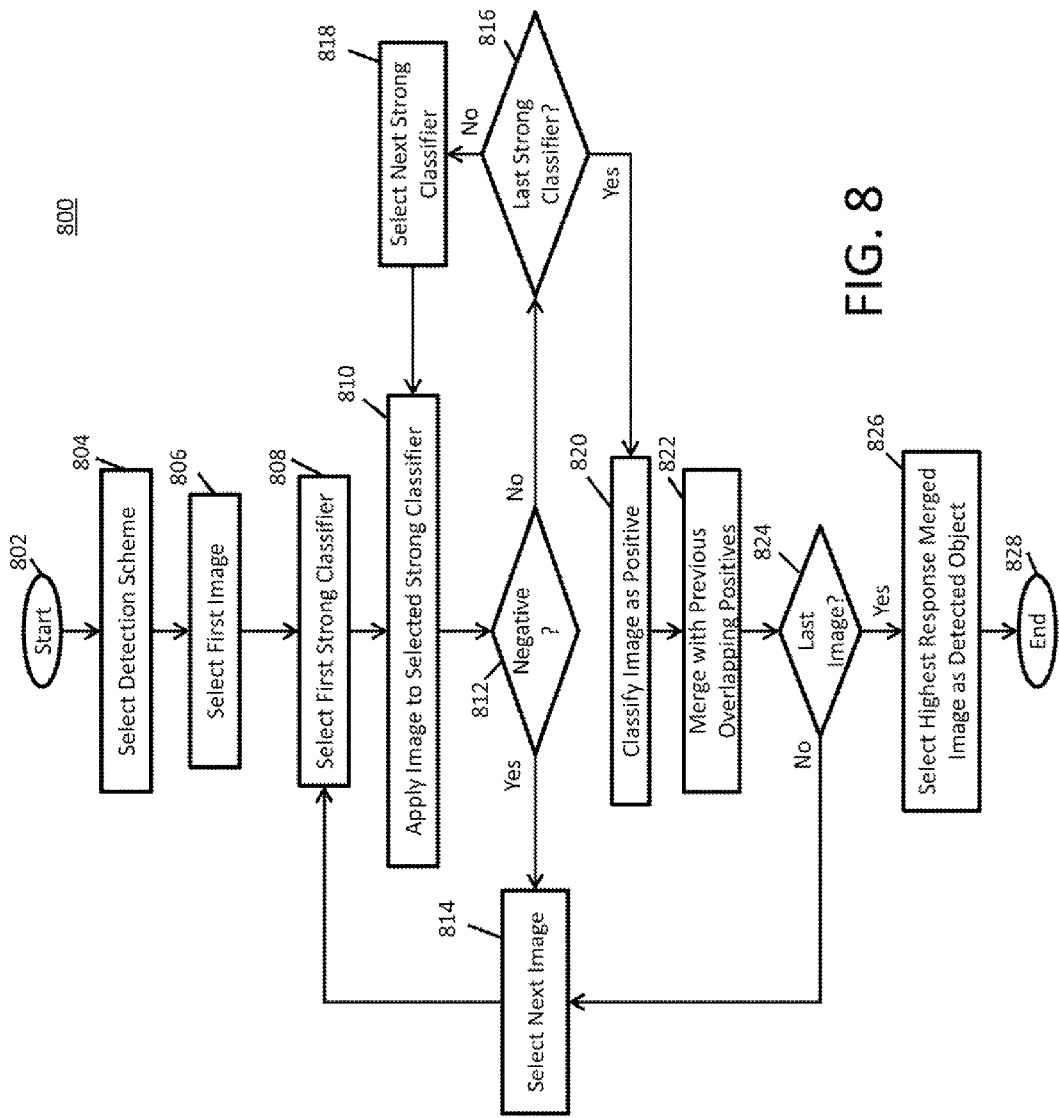
FIG. 8 is a flow diagram of a process for detecting objects in images using a classifier in accordance with some embodiments.

Turning to FIG. 8, an example process 800 for detecting images in accordance with some embodiments is shown. As illustrated, after process 800 begins at 802, the process can select a detection scheme at 804. Any suitable detection scheme can be used, such as the multi-stage or single-stage schemes described above. Next, the first image can be selected at 806. The first image can be selected in any suitable manner (e.g., such as randomly, in-order, etc.), and the image can be any suitable portion of another image (e.g., such as a random portion of a first image). Then, at 808, the first strong classifier in the selected scheme can be selected. At 810, the image can then be applied to the selected strong classifier, which can assign a classification and a score to the image. At 812, process 800 can then determine if the classification from the stage is negative. If so, the next image can be selected at 814 and process 800 can loop back to 808. Otherwise, at 816, it can be determined if the current stage is the last strong classifier. If not, then process 800 can select the next strong classifier at 818 and loop back to 810. Otherwise, process 800 can classify the image as positive at 820 and merge the image with any previous overlapping, positive-classified images at 822. Any suitable images can be identified as being overlapping in some embodiments. For example, images can be identified as being overlapping if the images share over 25% of their data (e.g., based on location and size of the image) and/or if their z-axis distance is less than five pixels. In some embodiments, when merging images, their individual scores can be added together. Next, at 824, process 800 can determine if the current image is the last image. If not, the process can select the next image at 814 and loop back to 808. Otherwise, the process can select the highest-score merged image as the detected object at 826 and terminate at 828.

In some embodiments, any suitable computer readable media can be used for storing instructions for performing the processes described herein, such as performing training of classifiers and classifying of images. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments cm be combined and rearranged in various ways.

What is claimed is:

1. A system for detecting an anatomical object in a non-training medical device image, comprising:
   at least one hardware processor that:
   receives a plurality of non-training medical device images produced by a medical imaging device, wherein the anatomical object has not yet been identified in the plurality of non-training medical device images when received;
   applies a non-training medical device image from the plurality of non-training medical device images to a classifier having a plurality of stages simultaneously, wherein a first stage of the plurality of stages and a second stage of the plurality of stages each includes a strong learner formed from a plurality of weak learners, and the weak learners in the second stage include a plurality of the weak learners included in the first stage; and identifies the non-training medical device image as being positive of showing the anatomical object based on the application the medical device image to the classifier.

2. The system of claim 1, wherein the classifier is an AdaBoost classifier.

3. The system of claim 1, wherein the classifier is based on a training of the classifier using positive samples and negative samples for the anatomical object.

4. The system of claim 1, wherein the anatomical object is a pulmonary trunk.

5. The system of claim 1, wherein the at least one hardware processor also merges the medical device image with at least one other medical device image.

6. The system of claim 1, wherein the at least one hardware processor also determines that the medical device image has the highest response of a plurality of medical device images.

7. The system of claim 1, wherein the medical device image is a computed tomography pulmonary angiography image.

8. A method for detecting an anatomical object in a non-training medical device image, comprising:

receiving a plurality of non-training medical device images produced by a medical imaging device, wherein the anatomical object has not yet been identified in the plurality of non-training medical device images when received;

applying a non-training medical device image from the plurality of non-training medical device images to a classifier having a plurality of stages simultaneously, wherein a first stage of the plurality of stages and a second stage of the plurality of stages each includes a strong learner formed from a plurality of weak learners, and the weak learners in the second stage include a plurality of the weak learners included in the first stage; and identifying the non-training medical device image as being positive of showing the anatomical object based on the application the medical device image to the classifier.

9. The method of claim 8, wherein the classifier is an AdaBoost classifier.

10. The method of claim 8, wherein the classifier is based on a training of the classifier using positive samples and negative samples for the anatomical object.

11. The method of claim 8, wherein the anatomical object is a pulmonary trunk.

12. The method of claim 8, further comprising merging the medical device image with at least one other medical device image.

13. The method of claim 8, further comprising determining that the medical device image has the highest response of a plurality of medical device images.

14. The method of claim 8, wherein the medical device image is a computed tomography pulmonary angiography image.

15. A non-transitory computer-readable medium containing computer-executable instructions that, when executed by a processor, cause the processor to perform a method for detecting an anatomical object in a non-training medical device image, the method comprising:

receiving a plurality of non-training medical device images produced by a medical imaging device, wherein the anatomical object has not yet been identified in the plurality of non-training medical device images when received;

applying a non-training medical device image from the plurality of non-training medical device images to a classifier having a plurality of stages simultaneously, wherein a first stage of the plurality of stages and a second stage of the plurality of stages each includes a strong learner formed from a plurality of weak learners, and the weak learners in the second stage include a plurality of the weak learners included in the first stage; and identifying the non-training medical device image as being positive of showing the anatomical object based on the application the medical device image to the classifier.

16. The non-transitory computer-readable medium of claim 15, wherein the classifier is an AdaBoost classifier.

17. The non-transitory computer-readable medium of claim 15, wherein the classifier is based on a training of the classifier using positive samples and negative samples for the anatomical object.

18. The non-transitory computer-readable medium of claim 15, wherein the anatomical object is a pulmonary trunk.

19. The non-transitory computer-readable medium of claim 15, wherein the method further comprises merging the medical device image with at least one other medical device image.

20. The non-transitory computer-readable medium of claim 15, wherein the method further comprises determining that the medical device image has the highest response of a plurality of medical device images.

21. The non-transitory computer-readable medium of claim 15, wherein the medical device image is a computed tomography pulmonary angiography image.

22. The system of claim 1, wherein in applying the non-training medical device image to the classifier, the at least one hardware processor also:

applies the non-training medical device image to the strong learner of the first stage;

determines whether the strong learner of the first stage classifies the non-training medical device image as being negative of showing the anatomical object; and in response to determining that the strong learner of the first stage classifies the non-training medical device image as being negative of showing the anatomical object:

applies the non-training medical device image to the strong learner of the second stage; and determines whether the strong learner of the second stage classifies the non-training medical device image as being negative of showing the anatomical object.

23. The method of claim 8, wherein applying the non-training medical device image to the classifier comprises:

applying the non-training medical device image to the strong learner of the first stage;

determining whether the strong learner of the first stage classifies the non-training medical device image as being negative of showing the anatomical object; and in response to determining that the strong learner of the first stage classifies the non-training medical device image as being negative of showing the anatomical object:

applying the non-training medical device image to the strong learner of the second stage; and determining whether the strong learner of the second stage classifies the non-training medical device image as being negative of showing the anatomical object.

24. The non-transitory computer-readable medium of claim 15, wherein the method, in applying the non-training medical device image to the classifier, comprises:
applying the non-training medical device image to the strong learner of the first stage;
determining whether the strong learner of the first stage classifies the non-training medical device image as being negative of showing the anatomical object; and
in response to determining that the strong learner of the first stage classifies the non-training medical device image as being negative of showing the anatomical object:
applying the non-training medical device image to the strong learner of the second stage; and
determining whether the strong learner of the second stage classifies the non-training medical device image as being negative of showing the anatomical object.

\* \* \* \* \*

UNITED STATES PATENT AND TRADEMARK OFFICE
CERTIFICATE OF CORRECTION

PATENT NO. : 9,684,957 B2  Page 1 of 1
APPLICATION NO. : 13/984808
DATED : June 20, 2017
INVENTOR(S) : Hong Wu et al.

It is certified that error appears in the above-identified patent and that said Letters Patent is hereby corrected as shown below:

On the Title Page

(54) Title "SYSTEMS METHODS, AND MEDIA FOR" should be --SYSTEMS, METHODS, AND MEDIA FOR--

Signed and Sealed this
First Day of August, 2017

Joseph Matal
*Performing the Functions and Duties of the
Under Secretary of Commerce for Intellectual Property and
Director of the United States Patent and Trademark Office*